United States Patent Office 3,463,758
Patented Aug. 26, 1969

3,463,758
HYDROLYSIS RESISTANT POLYESTER-URETHANES
Floyd D. Stewart, Akron, Ohio, assignor to The B. F. Goodrich Company, New York, N.Y., a corporation of New York
No Drawing. Filed Nov. 19, 1965, Ser. No. 508,855
Int. Cl. C08g 22/04
U.S. Cl. 260—75          1 Claim

ABSTRACT OF THE DISCLOSURE

Linear polyesterurethane polymers are found to have higher molecular weights and greatly improved resistance to water hydrolysis when they are made from polyester having an acid number of zero.

---

This invention relates to polyesterurethane elastomers which are substantially free of crosslinks, but which have the appearance and properties of crosslinked polyesterurethane vulcanizates and have hitherto unattained properties of resistance to hydrolysis.

U.S. Patent 2,871,218 discloses a valuable and important class of linear polyesterurethane materials prepared by reacting together (1) one mole of an essentially linear, hydroxyl-terminated polyester of a glycol of the formula $HO(CH_2)_xOH$ wherein $x$ is a number from 4 to 8 and a material selected from the class consisting of dibasic aliphatic acids having the formula $HOOC(CH_2)_xCOOH$ wherein $x$ is a number from 2 to 8, and their anhydrides, said polyester having an average molecular weight of from about 600 to 1200 and having an acid number less than 10, (2) from about 0.1 to 2.1 mols of a free glycol of the formula $HO(CH_2)_xOH$ wherein $x$ is a number from 4 to 8, said polyester and said free glycol together having an hydroxyl number of from about 185 to 250 and having an average hydroxyl number molecular weight of from about 450 to 600, and (3) from about 1.1 to 3.1 mols of a diphenyl diisocyanate having an isocyanate group on each phenyl nucleus, the molar amount of said polyester and said free glycol combined being essentially equivalent to the molar amount of said diisocyanate whereby there are essentially no unreacted groups of the class consisting of isocyanate and hydroxyl groups in said reaction product.

The polyester is ordinarily prepared by an esterification reaction with the dicarboxylic acid or anhydride are preferably straight chain glycols containing between 4 and 8 glycol to acid are preferred so as to obtain linear chains containing a preponderance of terminal hydroxyl groups.

The basic polyesters generally used include polyesters prepared by the esterification of such dicarboxylic acids as adipic, succinic, sebacic and the like, and their anhydrides.

The glycols used in the preparation of the polyester by reaction with the dicarboxylic acid or anhydride are preferably straight chain glycols containing between 4 and 8 carbon atoms such as butanediol-1,4, octamethylenediol-1,8, and the like. Glycols with 2 and 3 carbon atoms, ethylene glycol and propylene glycol, have also been found to be useful.

A free glycol in an amount from about 0.1 to 2.1 mols is present in the polyester prior to reaction with the diphenyl diisocyanate. The ratio of free glycol and diphenyl diisocyanate must be balanced so that the end reaction product is substantially free of excess isocyanate. The preferred glycol is butanediol-1,4.

The preferred diphenyl diisocyanates are the diphenyl methane diisocyanates including diphenyl methane diisocyanate, diphenyl methane-p,p'-diisocyanate, dichlorodiphenyl methane diisocyanate, dimethyl diphenyl methane diisocyanate, bibenzyl diisocyanate, and diphenyl ether diisocyanate.

Ratios of the three reactants, polyester, free glycol, and diisocyanate, used may vary from 1.1 mols of diphenyl diisocyanate, 1.0 mol of polyester and 0.1 mol of free glycol to 3.1 mols of diphenyl diisocyanate, 1.0 mol of polyester and 2.1 mols of free glycol.

The preferred polyester is an essentially linear, hydroxyl-terminated polyester having a molecular weight between 600 and 2000 and an acid number less than 10, preferably less than 5, and more preferably less than about 3 to give optimum physical properties in the polyesterurethane.

The linear polyesterurethane materials prepared according to the patent are tough, extrudable, moldable, melt at elevated temperatures, are free of crosslinks and are soluble in dimethylformamide, tetrahydrofuran and dioxane. These properties lead to their use in forming a variety of molded and extruded articles and articles formed from films and castings thereof. One unexpected shortcoming of these linear polyesterurethane polymers has turned out to be an inherent weakness toward water aging. When exposed to hydrolysis, the polymers degrade and lose their physical properties to a great degree.

The prior art has taught that polyester acid numbers less than about 3 are preferred to obtain a linear polyesterurethane product of optimum physical properties. It has now been observed that most of the physical properties of these linear polyesterurethanes remain quite constant as random melt polymerizations are conducted with the only variable being the lowering of the polyester acid number below about 3 to about 2.5, and to 1.0. However, it is completely unexpected to find that when the polyester acid number is 0.1 to zero, preferably zero, there is an astonishing improvement in the resistance of the product polyesterurethanes to water hydrolysis. A further feature of these linear polyesterurethane materials made with minimum acid number polyesters is that they exhibit higher levels of average number molecular weight, as determined by osmometry, than comparable polymers of the prior art. Higher molecular weight polymeric materials tend, in general, to have physical properties superior to those of similar materials of lower molecular weight. Polyesterurethanes prepared from 0.1 to 0.0 acid number polyesters have improved 140° C. air aging, and 212° F. stress relaxation in addition to greatly improved hydrolysis resistance.

Isocyanates are known to react with carboxylic acids since the acids contain active hydrogen; it is known that this reactivity for acids is less than that for alcohols and amines, but the prior art has assumed that carboxyl groups terminating polyester glycol are so nearly completely reacted in reaction with diisocyanate and diol that resulting poly(esterurethanes) will have a very low or zero acid number. It has now been determined, where it was not known before, that in the formation of the linear, hydroxyl-terminated polyester, in spite of the fact that an excess of glycol over dicarboxylic acid is employed, quite a number of the acid carboxyl groups actually survive intact without esterifying with the glycol hydroxyl. Further, many of these free carboxyl groups survive the reaction with diisocyanate and carry over in the unreacted form into the linear polyesterurethane. Here, in the ultimate polymers, the unreacted carboxyl initiates an autocatalytic hydrolysis that leads to premature polymer destruction. It is believed that the reaction of these terminal carboxyl groups leads to splitting of polymer chains and thereby holds the molecular weight of the polymer to levels lower than one desires to obtain.

It was once believed that the linear polyesterurethanes of the prior art patent had either very low or no acid number. Acid number is defined as the milligrams of KOH required to neutralize one gram of polymer. When a number of prior art polyesterurethanes were analyzed, they proved to have acid numbers actually ranging from 1.50 to 1.95. This is in the finished product, not in the raw material polyester, which has been preferred to have an acid number as low as about 3.

Polyesters have now been prepared with acid numbers ranging from about 3 to about zero. Physical properties of the ultimate linear polyesterurethanes remain quite uniform until the polyester acid number is reduced to 0.1 to zero. At this range there is an astonishing improvement in the property of resistance to water hydrolysis of the polymer produced, and the polymer is simultaneously found to exhibit higher number average molecular weight than when produced from the same materials and under the same conditions except that the polyester used has an acid number greater than 0.1.

The following examples will serve to illustrate the invention.

EXAMPLE I

A series of linear polyesterurethanes is prepared by reacting 2 mols of diphenyl methane diisocyanate, 1 mol of poly(tetramethylene adipate)glycol and 1 mol of butanediol-1,4. The polyester and free glycol are melted in a reactor with stirring and held for 20' at 5 mm. pressure at 110° C. The diisocyanate is added, stirred in, and reacted for 1 minute. The reaction product is transferred to sealed containers and held at 140° C. for 3.5 hours. Clear, snappy elastomers are obtained on cooling.

The only differences in the reactants employed in several runs are the molecular weights of the polyester and the acid numbers of the polyester. The acid number is determined on the product polyesterurethane polymers. Data are set forth in Table 1:

TABLE 1

| Run | Mols diisocyanate | Mols free glycol | Mols polyester/ mol. wt. polyester | Acid No. polyester | Polyester- urethane Acid No. |
|---|---|---|---|---|---|
| A | 2.0 | 1.0 | 1.0/972 | 3.29 | 1.95 |
| B | 2.0 | 1.0 | 1.0/972 | 3.29 | 1.80 |
| C | 2.0 | 1.0 | 1.0/1046 | 2.50 | 1.50 |
| D | 2.0 | 1.0 | 1.0/1046 | 2.50 | 1.50 |

The acid number of the polyesterurethane product is far greater than the zero it was believed to be from what was known in the prior art. Calculations based on these analyses show that in some cases only 5% of the polyestercarboxyl groups have actually reacted with the diisocyanate. These unreacted carboxyl groups in the polyesterurethane provide active sites for polymer degradation by initiating autocatalytic hydrolysis.

EXAMPLE II

A series of low acid number polyesters is made following the teaching of U.S. Patent 3,057,824. Poly(tetramethylene adipate) glycols are prepared from adipic acid and butanediol-1,4 by esterification-ester interchange reactions using 0.005 wt. percent stannous chloride catalyst. The polyester glycols are then random melt polymerized with butanediol-1,4 and diphenyl methane diisocyanate as in Example I. Acid numbers of the product polyesterurethane are determined.

TABLE 2

| Run | Mols diisocyanate | Mols free glycol | Mols polyester/ mol. wt. polyester | Acid No. polyester | Polyester- urethane Acid No. |
|---|---|---|---|---|---|
| E | 2.0 | 1.0 | 1.0/1,098 | 0.0 | [1] 0.10 |
| F | 3.0 | 2.0 | 1.0/1,001 | 0.1 | 0.15 |

[1] Falls within limits of experimental error.

EXAMPLE III

A series of polyesterurethane preparations is carried out in a 1.5 liter beaker equipped with a thermometer and an efficient propeller stirrer. Dried polyester is weighed into the tared beaker which is wrapped in foil and set on a hot plate. Polyester is heated to 158° C. and butanediol-1,4 extender, previously weighed in a hypodermic syringe, is added. Diphenyl methane diisocyanate is melted and weighed into a beaker and heated to 140° C. The diisocyanate is then poured into the reactor with stirring for 2–3 minutes. The reaction mixture is then poured into a Teflon coated tray and allowed to cool to room temperature.

Stress-strain tests for heat aging are run on 1/8" x 0.075" samples. Stress-strain tests under water hydrolysis are run on standard microsamples (.025" thick).

TABLE 3

| Run | E | F | G | H | J |
|---|---|---|---|---|---|
| Mol diisocyanate | 2.0 | 2.0 | 2.0 | 1.3 | 3.0 |
| Mol butanediol-1,4 | 1.0 | 1.0 | 1.0 | 0.3 | 0.3 |
| Mol poly(tetramethylene adipate)glycol | 1.0 | 1.0 | 1.0 | 1.0 | 1.0 |
| Poly(tetramethylene adipate) glycol mol. wt. | 1,010 | 1,058 | 1,058 | 1,058 | 1,058 |
| Poly(tetramethylene adipate) glycol acid No. | 2.8 | 0.1 | 0.1 | 0.1 | 0.1 |
| Molecular weight, $M_n$, of polyesterurethane | 45,000 | 71,000 | | 74,000 | 71,000 |
| Stress-strain (1/8" x 0.075"): | | | | | |
| Tensile, p.s.i. room. temp | 7,200 | 8,900 | 8,300 | 5,100 | 7,800 |
| Tensile, p.s.i. 212° F | 1,500 | 2,800 | 1,600 | | 4,900 |
| Percent tensile retained | 20.8 | 31.8 | 19.3 | | 62.9 |
| Tensile, p.s.i., aged 7 days at 140° C | 3,000 | 6,300 | 6,200 | | 5,700 |
| Percent tensile retained | 41.6 | 70.8 | 74.6 | | 73.0 |
| Stress-strain (micro): | | | | | |
| Tensile, p.s.i | 6,500 | 9,900 | 8,800 | 6,900 | 7,700 |
| Elongation, Percent | 610 | 525 | 580 | 675 | 425 |
| 300% mod., p.s.i | 1,200 | 1,300 | 1,200 | 300 | 4,100 |
| After 3 wks. water aging (70° C.): | | | | | |
| Tensile, p.s.i | 1,000 | 8,000 | 8,200 | 4,800 | 8,700 |
| Elongation, percent | 600 | 550 | 685 | 755 | 490 |
| 300% mod., p.s.i | 800 | 1,500 | 1,200 | 200 | 4,100 |
| Percent tensile retention | 15.4 | 81 | 93 | 69.5 | 101 |

EXAMPLE IV

A series of polyesterurethanes is prepared using the materials and procedure of Example III. Number average molecular weights of the polymers produced are measured by the osmometric method.

| Run | K | L | M |
|---|---|---|---|
| Mol diisocyanate | 2.00 | 2.00 | 2.00 |
| Mol polytetramethylene adipate) glycol | 1.00 | 1.00 | 1.00 |
| Mol butanediol-1,4 | 1.00 | 1.00 | 1.00 |
| Acid number of polyester | 5.1 | 2.6 | 0.1 |
| Poly(ester-urethane) Intrinsic viscosity | 0.892 | 1.125 | 1.47 |
| Molecular wt., $\bar{M}_n$ | 27,700 | 36,600 | 46,500 |

The data shows that a controlled reduction in acid number of the polyester employed below 5.1 leads to a significant increase in molecular weight.

I claim:

1. In the method for preparing a tough, essentially linear polyesterurethane elastomer characterized by being thermoplastic, extrudable, moldable, molten at elevated temperatures, substantially soluble in dimethylformamide and substantially free of crosslinks, which comprises bringing together as essential polyesterurethane forming ingredients (1) one mol of an essentially linear hydroxyl-terminated polyester of a saturated aliphatic glycol containing from 2 to 10 carbon atoms and having hydroxyl groups on its terminal carbon atoms and a material selected from the group consisting of a dicarboxylic acid of the formula $HOOC-(CH_2)_x-COOH$ where $x$ is a number from 2 to 8 and its anhydride, said polyester having an average molecular weight between 600 and 2000 mixed with (2) from about 1.1 to 3.1 mols of a diphenyl diisocyanate having an isocyanate group on each phenyl nucleus, in the presence of (3) from about 0.1 to 2.1 mols of a saturated aliphatic free glycol containing from 2 to 10 carbon atoms and having hydroxyl groups on its terminal carbon atoms, the molar amount of said diphenyl diisocyanate being adjusted so as to be essentially equivalent to the molar amount of said polyester and said free glycol so that the resulting elastomer contains essentially no unreacted groups of the class consisting of isocyanate and hydroxyl groups, and heating the resulting mixture to thereby obtain said elastomer, the improvement comprising employing said polyester only when the acid number of said polyester is in the range of 0.1 to 0.0, the said polyesterurethane elastomer then being further characterized by outstanding resistance to water hydrolysis.

References Cited

UNITED STATES PATENTS

| | | | |
|---|---|---|---|
| 2,871,218 | 1/1959 | Schollenberger | 210—75 XR |
| 3,057,824 | 10/1962 | Le Bras et al. | 260—75 |
| 3,150,114 | 9/1964 | Rockoff | 260—75 XR |

DONALD E. CZAJA, Primary Examiner

M. J. WELSH, Assistant Examiner

PO-1050
(5/69)

UNITED STATES PATENT OFFICE
CERTIFICATE OF CORRECTION

Patent No. 3,463,758      Dated August 26, 1969

Inventor(s) Floyd D. Stewart

It is certified that error appears in the above-identified patent and that said Letters Patent are hereby corrected as shown below:

Column 1, line 49, after "reaction", delete "with the dicarboxylic" and insert --of an aliphatic dibasic--; after "anhydride" delete "are pref-" and insert --thereof with a glycol. Molar ratios of more than 1 mol of --; line 50, delete entire line. Column 3, line 20, after "number" delete "greaer" and insert --greater--. Column 4, line 16, last figure, delete "0.10" and insert --0.15--; line 17, last figure, delete "0.15" and insert --0.10--; line 66, after "poly" insert --(--; line 69, after $\overline{M}_n$, delete quotation mark. Column 6, line 13, after "Schollenberger" delete "210" and insert --260--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents